(12) United States Patent
Zanter

(10) Patent No.: US 9,170,886 B2
(45) Date of Patent: Oct. 27, 2015

(54) RELAXED ANCHOR VALIDATION IN A DISTRIBUTED SYNCHRONIZATION ENVIRONMENT

(71) Applicant: International Business Machines Corporation, Armonk, NY (US)

(72) Inventor: David Laverne Zanter, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 110 days.

(21) Appl. No.: 13/647,879

(22) Filed: Oct. 9, 2012

(65) Prior Publication Data

US 2014/0101101 A1    Apr. 10, 2014

(51) Int. Cl.
*G06F 17/30* (2006.01)
*G06F 11/14* (2006.01)
*G06F 11/20* (2006.01)

(52) U.S. Cl.
CPC ............ *G06F 11/14* (2013.01); *G06F 11/2038* (2013.01); *G06F 11/2097* (2013.01); *G06F 17/30578* (2013.01); *G06F 11/2046* (2013.01)

(58) Field of Classification Search
CPC .................................................. G06F 17/30578
USPC .......................................................... 707/625
See application file for complete search history.

(56) References Cited

U.S. PATENT DOCUMENTS

| | | | |
|---|---|---|---|
| RE38,457 E * | 3/2004 | Rothrock et al. | 370/261 |
| 7,130,871 B2 | 10/2006 | Acree et al. | |
| 7,792,790 B2 | 9/2010 | Kim | |
| 8,185,494 B2 * | 5/2012 | Davis et al. | 707/610 |
| 2005/0091240 A1 * | 4/2005 | Berkowitz et al. | 707/100 |
| 2009/0307279 A1 | 12/2009 | Freedman | |
| 2010/0241764 A1 * | 9/2010 | Luo et al. | 709/248 |
| 2010/0268844 A1 * | 10/2010 | Quinlan et al. | 709/238 |

* cited by examiner

*Primary Examiner* — Fred I Ehichioya
*Assistant Examiner* — Kris Mackes
(74) *Attorney, Agent, or Firm* — Scully, Scott, Murphy & Presser, P.C.

(57) ABSTRACT

Relaxing of anchor validation in a distributed synchronization environment, in one aspect, updates a synchronization anchor during synchronization of data between computing devices only in response to determining that the data operation if repeated the second time on the computing device would change overall data stored on the computing device.

18 Claims, 3 Drawing Sheets

RELAXED ANCHOR VALIDATION IN A DISTRIBUTED SYNCHRONIZATION ENVIRONMENT

FIELD

The present application relates generally to computers, and computer environment, and more particularly to synchronization of data among servers and devices.

BACKGROUND

Data in various computing systems (e.g., desktops, mobile devices, web services) may be kept synchronized. In a synchronization environment, there may exist a synchronization server that provides data synchronization (also referred to as "sync") services to a device, e.g., a mobile device. The device communicates with the synchronization server using a synchronization protocol where sync anchors are exchanged in order to ensure consistency. Examples of synchronization protocols or standards include Synchronization Markup Language (SyncML) and ActiveSync. In SyncML, a central SyncML server, for example, may hold a central copy of data, against which client devices may synchronize their data.

Those anchors are incremented each time a synchronization session occurs between a device and the server. In addition there is a backup synchronization server that is asynchronously replicating with the primary sync server. This replicating replicates data including, but not limited to, the anchors that are being used between the server and the device, and also a timestamp of when the last time the sync server polled the backup server. This replication is performed asynchronously and on a replication schedule. Hence, it is possible that in the event of a fail-over in which the backup server is requested to become the primary server, the backup server might not have the most recent anchor exchanged between the device and the primary server. Once the backup server takes over as the primary server in such an event, some of the recent anchors may be lost.

With current implementations, if the anchors between the device and the server mismatch, a 'slow' or 'refresh' synchronization would be performed, where the server and client would start from scratch to ensure that there exists consistency between the server and the client.

Another known implementation suggests a device and a server to keep state of exchange of all items and generate a change log delta from any two points, and utilize that log in the scenario of an anchor mismatch. However, this method is only applicable when the devices can be programmed in advance with this knowledge.

BRIEF SUMMARY

A method of relaxing anchor validation in a distributed synchronization environment, in one aspect, may comprise keeping a synchronization anchor on a computing device. The method may also comprise invoking a data operation that operates on data stored on the computing device. The method may further comprise synchronizing the operated on data of the computing device with a synchronization server. The method may yet further comprise determining whether the data operation if repeated a second time on the computing device would have a changing effect on the computing device. The method may still yet comprise, in response to determining that the data operation if repeated the second time on the computing device would have a changing effect on the computing device, updating the synchronization anchor. The method may also comprise, in response to determining that the data operation if repeated the second time on the computing device would not have a changing effect on the computing device, maintaining the same synchronization anchor.

A system for relaxing anchor validation in a distributed synchronization environment, in one aspect, may comprise a computing device. The system may also comprise a synchronization anchor. The system may further comprise a synchronization module operable to synchronize data stored on the computing device with a synchronization server, the data having been operated on by a data operation invoked on the data. The synchronization module may be further operable to determine whether the data operation if repeated a second time on the computing device would have a changing effect on the computing device. In response to determining that the data operation if repeated the second time on the computing device would have a changing effect on the computing device, the synchronization module may be further operable to update the synchronization anchor. In response to determining that the data operation if repeated the second time on the computing device would not have a changing effect on the computing device, synchronization module may be further operable to maintain the synchronization anchor in its previous state.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one aspect describes an improvement to a synchronization environment in computing systems. In one embodiment, a methodology of the present disclosure refrains from incrementing anchors in a synchronization session, for items which could be successfully reapplied or rerun without an ill effect. Such methodology shrinks the window under which a 'refresh' synchronization is required, e.g., by reducing the number of times the anchors are incremented, and therefore reducing the probability of the anchors mismatching.

Figure 1:
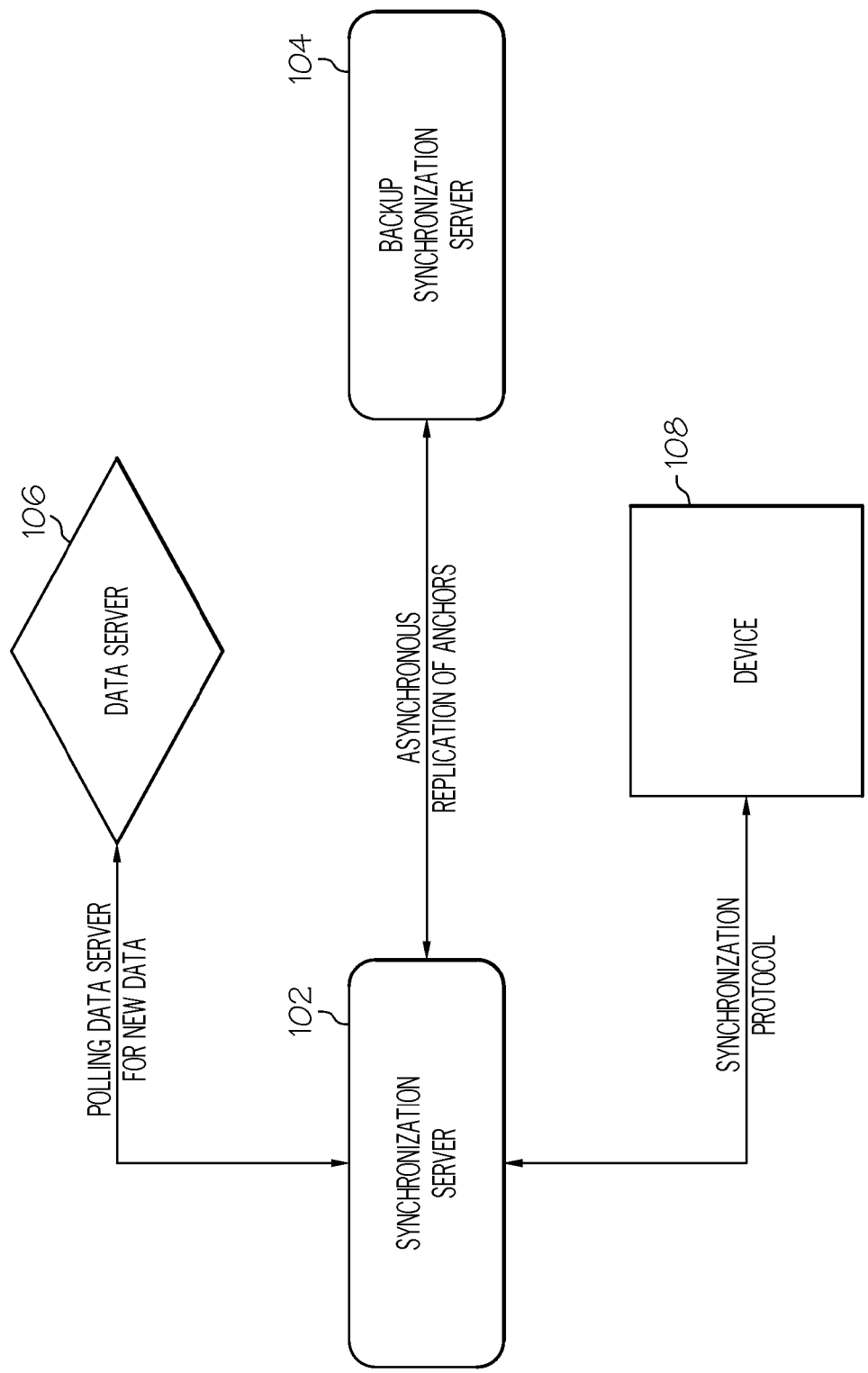
FIG. 1 illustrates components in an example synchronization environment in one embodiment of the present disclosure.

FIG. 1 illustrates components in an example synchronization environment in one embodiment of the present disclosure. For illustration purposes, assume that an anchor is a sequence number being incremented by one on each synchronization action, and that Server A is a primary server 102, while Server B is a backup server 104. Also, assume that a timestamp tracked between the Sync Server (primary server) 102 and the data server 106 is the timestamp of the last successful poll of the data. In this example, the synchronizing of the data comprises additions, modifications and deletion of items performed on both a device 108 and on the data server 106. The device 108 shown represents a device that may be communicating with the data server 106. In the example synchronization environment, there may be one or more such devices, for example, mobile devices that may communicate with a data server.

It is assumed that the data server itself is made highly available, for example, through a redundancy mechanism. For example, any of the existing technologies may be used to make a data server redundant such as log shipping between primary and backup, or having a shared storage area network (SAN) between two nodes, etc. Any type of redundancy mechanism may be utilized. Thus, the modifications and deletes performed on by the device can safely be performed a second time without much ill effect. For instance, a delete is capable of being performed twice, e.g., even if the first delete of "document A" was successful. If the sync failed over to the backup sync server, and attempted to delete "document A" again, the result would be a no-op since it is already deleted, and there would not be any other effect (no ill effect). Depending on the document types, an update operation may also be performed a second type without any "ill effect". One example of such update operation is an update of an email document that changes the email document's status to "read status". If that update was successfully performed, and then later re-performed, no other effects should result from the re-performance, and such update operation would be considered an acceptable situation.

In contrast, other types of changes such as a create operation may possibly have an ill effect of creating a duplicate.

The following flow illustrates an example scenario:

1) Server A (e.g., 102) is polled and the data is made up-to-date or synchronized with that of the data server 106 at current time, e.g., "5 pm". Server A 102, Device 108, and Server B 104 have Anchor set to '1'.

2) The Device 108 deletes an item, "G", and syncs to Server A 102, with Anchor '1'.

3) Server A 102 deletes this item from the Data Server 106. Since only a delete is performed, Anchor is left at 1.

4) Server A 102 crashes without replicating its anchor or timestamp.

5) Server B 104 takes over as synchronization server and polls Data Server 106 since "5 pm" and finds a delete for item "G".

6) Device 108 syncs and Server B 102 sends a delete for "G" again to Device 108. Since Device 108 has already deleted that item, there is no ill effect in this scenario.

The following example illustrates the same logic used for modification of data:

1) Server A is polled and made up-to-date or synchronized with Data Server 106 at current time "5 pm". Server A 102, Device 108, and Server B 104 all have Anchor set to '1'.

2) Device 108 modifies an item, e.g., "G", and syncs to Server A 102, with Anchor set at '1'.

3) Server A 102 modifies this item in the Data Server 106. Since only a modification is performed, Anchor is left at '1'.

4) Server A 102 crashes without replicating its anchor or timestamp. Server B 104 takes over as a primary synchronization server.

5) Server B 104 polls Data Server 106 since "5 pm" and finds a modification for item "G".

6) Device 108 syncs and Server B 104 sends modification for "G" again to Device 108.

Since it is the exact same data, the modification can be performed again on the Device 108 with no difference in effect.

The above examples illustrate cases in which no ill effect occurs. However, updates that include an addition of data may result in a duplicate add. Therefore, in such a scenario, the methodology of the present disclosure in one embodiment increments the counter or sets Anchor to '2'. The following example illustrates such scenario:

1) Server A 102 is polled and made up-to-date or synchronized with the Data Server at current time "5 pm". Server A 102, Device 108, and Server B 104 have Anchor set to '1'.

2) Device 108 adds an item, "G", and syncs to Server A 102 with Anchor at '1'.

3) Server A 102 adds this item to the Data Server 106. Since an add operation is performed, the counter, Anchor is incremented and set to '2' for Device 108 and Server A 102.

4) Server A 102 crashes without replicating its anchor or timestamp. Server B 104 takes over.

5) Device 108 syncs but since Device's Anchor is set at '2', it does not match Server B's Anchor that is set at '1'. A refresh synchronization is performed.

By the same logic, modification and deletes (or another operation that does not affect the data even when the operation is repeated on the data) performed on the server side can also be repeated without a difference in effect, and thus the count or Anchor can remain the same on the server side, while server side adds (or another operation that results in a change when the operation is repeated) trigger the server side Anchor to be incremented.

Figure 2:
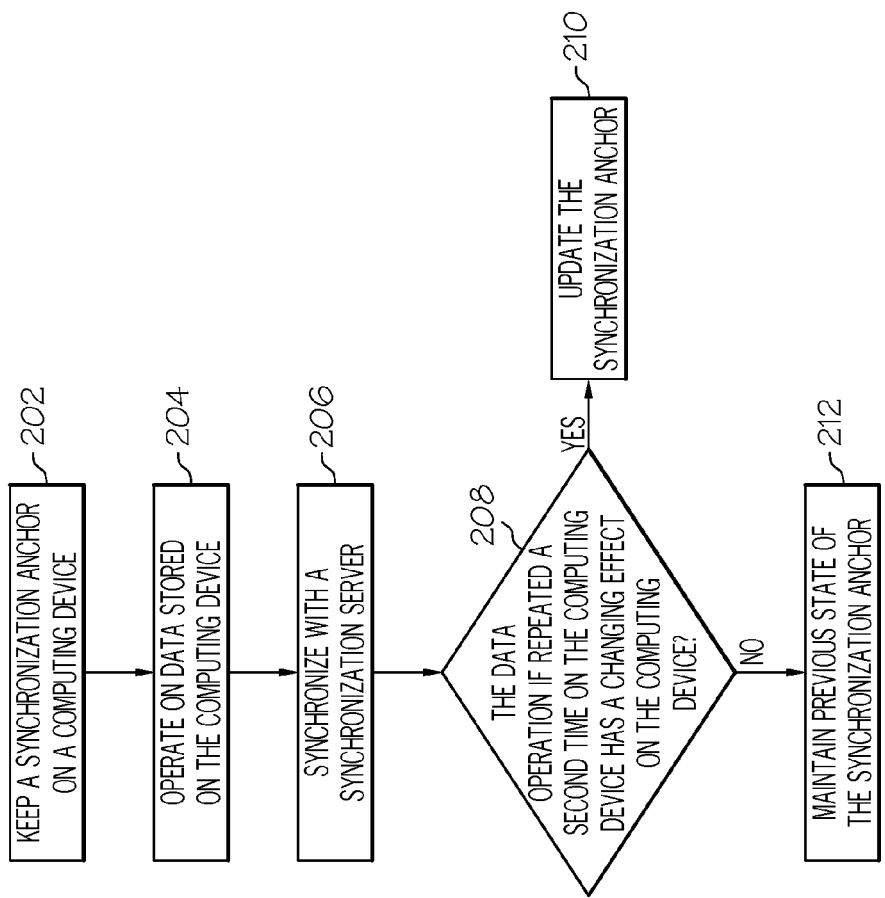
FIG. 2 is a flow diagram illustrating a method of the present disclosure in one embodiment.

FIG. 2 is a flow diagram illustrating a method of relaxing anchor validation in a distributed synchronization environment in one embodiment. At 202, a synchronization anchor may be kept on a computing device. The synchronization anchor may be a data structure or the like allocated on the computing device. In another aspect, the synchronization anchor may be kept in a hardware register or the like storage element associated with the computing device. Examples of a computing device may include, but are not limited to, a mobile device, a computer server such as a data server. At 204, invoking a data operation operates on data stored on the computing device. The data operation may be a delete operation, an add operation, or a modify operation, or another data operation, combinations thereof. At 206, the computing device synchronizes with a synchronization server.

At 208, it is determined whether the data operation if repeated a second time on the computing device would have a changing effect on the computing device, e.g., changes overall data stored on the device. For example, data operations such as delete or modify operations are determined as not having changing effect even if repeated; data operations such as an add operation is determined as having a changing effect if repeated. At 210, in response to determining that the data operation if repeated the second time on the computing device would have a changing effect on the computing device, the synchronization anchor is updated. At 212, in response to determining that the data operation if repeated the second time on the computing device would not have a changing effect on the computing device, the synchronization anchor maintained at its previous state.

The processing shown at 208, 210 and 212 may be performed at the computing device as well as in the synchronization server. For instance, from the viewpoint of the synchronization server, the server may receive a request for synchronization, and in response perform the data synchronization as well as updating or keeping the previous value associated with its synchronization anchor.

The updating of the synchronization anchor in response to determining that the data operation if repeated the second time on the computing device would have a changing effect on the computing device, comprises incrementing a value stored in the synchronization anchor.

Figure 3:
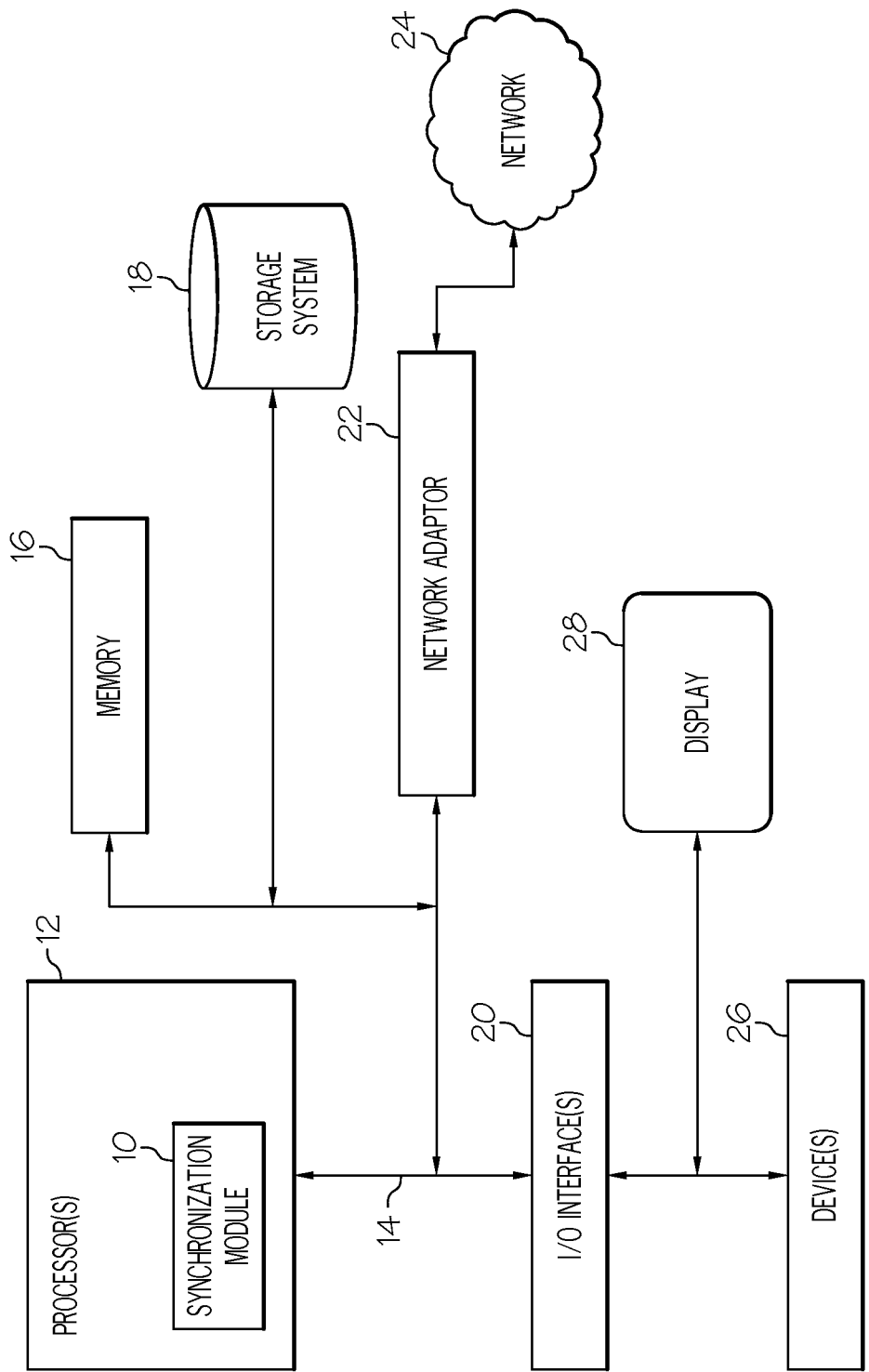
FIG. 3 illustrates a schematic of an example computer or processing system that may implement a system in one embodiment of the present disclosure.

FIG. 3 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a synchronization module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method of relaxing anchor validation in a distributed synchronization environment, comprising:
   keeping a synchronization anchor on a computing device;
   invoking a data operation that operates on data stored on the computing device;
   synchronizing the operated on data of the computing device with a synchronization server;
   determining whether the data operation if repeated a second time on the computing device would have a changing effect on the computing device;
   in response to determining that the data operation if repeated the second time on the computing device would have a changing effect on the computing device, updating the synchronization anchor by incrementing a value stored in the synchronization anchor; and
   in response to determining that the data operation if repeated the second time on the computing device would not have a changing effect on the computing device, maintaining the same synchronization anchor, wherein the data operation that allows the same synchronization anchor to be maintained comprises a delete of a same document.

2. The method of claim 1, wherein the data operation comprises a delete operation, an add operation, or a modify operation, or combinations thereof.

3. The method of claim 1, wherein the computing device comprises a mobile device.

4. The method of claim 1, wherein the computing device comprises a computer server device.

5. The method of claim 1, wherein if the data operation is a delete operation or a modify operation, it is determined that the data operation if repeated the second time on the computing device would not have a changing effect on the computing device.

6. The method of claim 1, wherein if the data operation is an add operation, it is determined that the data operation if repeated the second time on the computing device would have a changing effect on the computing device.

7. A non-transitory computer readable storage medium storing a program of instructions executable by a machine to perform a method of relaxing anchor validation in a distributed synchronization environment, comprising:
   keeping a synchronization anchor on a computing device;
   invoking a data operation that operates on data stored on the computing device;
   synchronizing the operated on data of the computing device with a synchronization server;
   determining whether the data operation if repeated a second time on the computing device would have a changing effect on the computing device;
   in response to determining that the data operation if repeated the second time on the computing device would have a changing effect on the computing device, updating the synchronization anchor by incrementing a value stored in the synchronization anchor; and
   in response to determining that the data operation if repeated the second time on the computing device would not have a changing effect on the computing device, maintaining the synchronization anchor in its previous state, wherein the data operation that allows the synchronization anchor to be maintained in its previous state comprises at least one or more of a modification operation on the data and an update on a status of the data.

8. The computer readable storage medium of claim 7, wherein the data operation comprises a delete operation, an add operation, or a modify operation, or combinations thereof.

9. The computer readable storage medium of claim 7, wherein the computing device comprises a mobile device.

10. The computer readable storage medium of claim 7, wherein the computing device comprises a computer server device.

11. The computer readable storage medium of claim 7, wherein if the data operation is a delete operation or a modify operation, it is determined that the data operation if repeated the second time on the computing device would not have a changing effect on the computing device.

12. The computer readable storage medium of claim 7, wherein if the data operation is an add operation, it is determined that the data operation if repeated the second time on the computing device would have a changing effect on the computing device.

13. A system for relaxing anchor validation in a distributed synchronization environment, comprising:
   a computing device;
   a synchronization anchor;
   a synchronization module operable to synchronize data stored on the computing device with a synchronization server, the data having been operated on by a data operation invoked on the data, the synchronization module further operable to determine whether the data operation if repeated a second time on the computing device would have a changing effect on the computing device, in response to determining that the data operation if repeated the second time on the computing device would have a changing effect on the computing device, the synchronization module further operable to update the synchronization anchor by incrementing a value stored in the synchronization anchor, and in response to determining that the data operation if repeated the second time on the computing device would not have a changing effect on the computing device, synchronization module operable to maintain the synchronization anchor in its previous state responsive to the data operation, the data operation that allows the synchronization anchor to be maintained and not updated comprises at least one or more of a modification operation on the data and an update on a status of the data.

14. The system of claim 13, wherein the synchronization module is operable to increment the synchronization anchor for updating the synchronization anchor in response to determining that the data operation if repeated the second time on the computing device would change overall data stored on the computing device.

15. The system of claim 13, wherein the data operation comprises a delete operation, an add operation, or a modify operation, or combinations thereof.

16. The system of claim 13, wherein the computing device comprises a mobile device.

17. The system of claim 13, wherein the computing device comprises a computer data server device.

18. The system of claim 13, wherein the synchronization anchor is a data structure associated with the computing device.

* * * * *